US006851706B2

United States Patent
Roberts et al.

(10) Patent No.: US 6,851,706 B2
(45) Date of Patent: Feb. 8, 2005

(54) SIDE-IMPACT, VARIABLE THICKNESS VEHICULAR AIRBAG

(75) Inventors: Brad Roberts, Clinton Township, MI (US); Deanna Kaprelian, Mount Clemens, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/104,591

(22) Filed: Mar. 21, 2002

(65) Prior Publication Data

US 2003/0178831 A1 Sep. 25, 2003

(51) Int. Cl.[7] .............................................. B60R 21/22
(52) U.S. Cl. ................................................. 280/730.1
(58) Field of Search .......................... 280/730.1, 730.2, 280/731, 743.1

(56) References Cited

U.S. PATENT DOCUMENTS

| 4,169,613 | A | * | 10/1979 | Barnett ........................ 280/732 |
| 4,262,931 | A | * | 4/1981 | Strasser et al. ............. 280/729 |
| 5,240,283 | A | * | 8/1993 | Kishi et al. .................. 280/729 |
| 5,529,337 | A | * | 6/1996 | Takeda et al. ............... 280/729 |
| 5,577,765 | A | * | 11/1996 | Takeda et al. ............... 280/729 |
| 6,279,944 | B1 | * | 8/2001 | Wipasuramonton et al. ........................ 280/730.2 |
| 6,517,109 | B1 | * | 2/2003 | Van Poppel ............. 280/743.1 |
| 6,554,313 | B2 | * | 4/2003 | Uchida ........................ 280/729 |

FOREIGN PATENT DOCUMENTS

| EP | 0 653 335 B1 | 11/1994 |
| EP | 0 771 698 B1 | 10/1996 |

* cited by examiner

*Primary Examiner*—Faye M. Fleming
(74) *Attorney, Agent, or Firm*—Sally J. Brown (57) ABSTRACT

A variable thickness vehicular airbag including a primary cushion and a contact cushion. The primary cushion is constructed of a top panel and a bottom panel joined to form a cushion. The contact cushion is joined to one of the panels of the primary cushion. The contact cushion may have an expansion panel and optionally an expansion sleeve. This cushion encompasses an opening in the outer panel and functionally increases the thickness and volume of the primary airbag. This airbag design may be useful in thorax airbags, thorax/pelvic airbags, thorax/head airbags, and inflatable curtain airbags to more effectively absorb the impact of an occupant with a wall of a vehicle during vehicular collisions.

29 Claims, 7 Drawing Sheets

SIDE-IMPACT, VARIABLE THICKNESS VEHICULAR AIRBAG

BACKGROUND OF THE INVENTION

1. Field of the Invention

The present invention relates to automobile airbags. More specifically, the present invention relates to a side impact airbag with a thickness that varies over an area of the bag.

2. Description of Related Art

Inflatable airbags enjoy widespread acceptance for use in motor vehicles and are credited with preventing numerous deaths and injuries. Some statistics estimate that the use of frontally-placed airbags reduces the number of fatalities in head-on collisions by 25% among drivers using seat belts and by more than 30% among unbelted drivers. Other statistics suggest that in a frontal collision, the combination of a seat belt and an airbag can reduce serious chest injuries by 65% and serious head injuries by up to 75%. These numbers and the thousands of prevented injuries they represent demonstrate the life-saving potential of airbags and the need to encourage their use, production, and development.

As a result in part of benefits such as those described above, automakers are now required to install airbags in most new vehicles bound for sale in the United States. Many automobile manufacturers have turned this requirement of implementation of airbag technology into a marketing tool. Enticed by the promise of added safety, vehicle purchasers frequently seek out vehicles with sophisticated airbag systems.

Airbags are often installed in the steering wheel and in the dashboard on the passenger side of a car. In the event of an accident, an accelerometer within the vehicle measures the abnormal deceleration and triggers the ignition of an inflator. The inflator explosively fills each airbag with expanding gases. The airbags rapidly inflate in front of the driver and passenger to protect them from impact with the steering wheel, dashboard, or windshield.

A modern airbag apparatus may include an electronic control unit (ECU) and one or more airbag modules. The ECU is usually installed in the middle of an automobile, between the passenger and engine compartments. If the vehicle has a driver's side airbag only, the ECU may be mounted in the steering wheel. The ECU includes a sensor that continuously monitors the acceleration and deceleration of the vehicle and sends this information to a processor which processes it using an algorithm to determine if the vehicle is in an accident situation.

When the processor determines, based on pre-determined criteria, that the vehicle is in an accident situation, the ECU transmits an electrical current to an initiator in the airbag module. The initiator activates an inflator or gas generator that typically uses compressed gas, solid fuel, or a combination of the two, to rapidly generate a large volume of gas. The gas is channeled to inflate an airbag to absorb the impact of a passenger and thus and prevent injury to the passenger. The airbag then deflates to release the vehicle occupant and prevent asphyxiation in the case of an occupant who has lost consciousness during the collision situation. Some airbags may be fully inflated within 50 thousandths of a second and deflated within two tenths of a second.

An airbag cover, also called a trim cover panel, is generally used to cover a compartment that contains the airbag module. The airbag may be mounted on a steering wheel, dashboard, vehicle door, along a vehicle roof rail, vehicle wall, vehicle floor, or beneath a dashboard. The airbag cover is typically made of a rigid plastic and may be forced open by the pressure from the deploying airbag. In deploying the airbag, it is preferable to retain the airbag cover in at least partial attachment to the vehicle to prevent the airbag cover from flying loose in the passenger compartment. If the airbag cover were allowed to detach and freely move into the passenger compartment, it could cause injury to a passenger.

In an effort to further improve driver and passenger safety, side-impact airbags were developed. These specialized airbags function by providing a buffer between the side of a vehicle and the body of a driver or passenger of the vehicle during accidents in which the side of a vehicle is struck by another vehicle or other object.

In side-impact vehicle accidents, the health and safety of a vehicle occupant is threatened by potential impact of the occupant with the side of the vehicle as well as by possible impingement of the walls of the vehicle into the passenger cabin. In order to protect occupants, it is important to keep the occupant away from the zone of impact located along the side of the vehicle. This helps to dampen the impact to the side of the vehicle, prevent occupant contact with the side of the vehicle, and protect the occupant from injuries cause by deformation of the side of the vehicle and possible impingement of the wall into the passenger cabin.

Further, occupant protection is often maximized when the airbag is contacted by the occupant before the occupant has accelerated through a large distance, and when the thickness of the bag is sufficient to completely or almost completely decelerate the vehicle occupant.

In response to this need, a class of "thorax bags"—airbags specialized to intervene between an occupant and the wall of a vehicle—were developed. This class of airbags was designed to deploy from a compartment within the door, ceiling, or occupant's seat within the vehicle in the instant between the impact of the colliding vehicle and contact of the occupant with the side of the vehicle. This class of airbags includes inflatable curtain airbags, also referred to as "roof-rail airbags." During a side impact crash event, thorax bags inflate rapidly to cushion the impact of the thorax of an occupant with the wall of the vehicle. Other airbag configurations, such as inflatable curtains, have also been developed to deploy between an occupant and the vehicle walls to similarly cushion the impact of an occupant with an internal surface of a vehicle.

As experience with the manufacture and use of airbags has progressed, the challenges faced by those building and using airbags have become better understood. First, most airbags are designed to rapidly inflate to provide a cushion in front of or alongside an occupant based on a presumption that the occupant will be in a predetermined position. Problems may occur when the occupant is "out of position" in regard to this presumed position.

It was appreciated that in order to provide optimal protection, the bag of this type should be designed to expand to a size sufficient to minimize the distance between the thorax of the occupant and the region of the face of the airbag that the thorax will impact. In such a configuration, the space available to decelerate the thorax would be maximized, while the space available for the thorax to accelerate would be minimized.

In addition, as with other types of airbags, thorax bags must be deployed rapidly in order to be effective. They are most effective when deployed without striking the occupant of the vehicle. Injuries are generally seen where the occupant of the vehicle is in a position unforeseen by the designers of an airbag. These "out-of-position" injuries are important to predict in order to attempt to design a product less prone to cause such injuries.

In addition to the above factors, it is understood in the art that the stored size of an airbag, along with its housing and inflator, must be minimized. This allows the airbag to be accommodated in a wide variety of vehicle designs. It also facilitates installation of the airbag with minimal adaptation of the design of the vehicle and the airbag. Large airbags require larger inflators and housings, and thus there is an incentive to use the smallest effective airbag in a given application.

Further, the operational space requirements of many airbags make installation difficult. The cushion portion of an airbag, which is the portion impacted by a user, must be mounted some distance from a passenger to give the airbag sufficient space to inflate. Because airbags, and especially side impact airbags, must deploy rapidly to adequately protect, they inflate with considerable speed and force. As a result, placement too close to a vehicle occupant increases the risk that the occupant will be injured by the airbag itself. Some compact vehicles simply do not have sufficient interior space to safely accommodate the bulk of airbags such as side impact airbags.

Another difficulty is that many previously known airbags are expensive to produce and install. This difficulty is compounded by the fact that due to variance in the space available in various models of vehicles, the design of the interior of the vehicles themselves, and needed placement of the airbag, airbag designs may need to be modified to be useful in a given line of vehicles. In some cases, the room available to house an airbag assembly, including a housing, the airbag, inflator, and trim panel, may be insufficient to contain a sufficiently large airbag.

Insufficiency in size is determined in side-impact airbags by evaluating the likelihood of a vehicle occupant striking the wall of the vehicle despite the existence of an airbag. Such an event is called a "strikethrough" and may be attributed to insufficient airbag stiffness, thickness, volume, or any combination of these factors. Adjusting any of these factors generally requires increasing the size of the airbag, the inflator, and often the airbag housing itself.

Accordingly, a need exists for an airbag suitable for use as a side-impact thorax airbag, head/thorax airbag, thorax/pelvis airbag, and inflatable curtain that may be adapted in size to minimize the distance between a vehicle occupant and the deployed airbag. It would be an improvement in the art to provide an airbag whose thickness could be varied to allow better deceleration of a vehicle occupant without creating the need to modify the airbag housing or inflator. Such an adjustable volume side-impact airbag is disclosed herein.

SUMMARY OF THE INVENTION

The apparatus of the present invention has been developed in response to the present state of the art, and in particular, in response to the problems and needs in the art that have not yet been fully solved by currently available side-impact airbags.

In accordance with the invention as embodied and broadly described herein in the preferred embodiment, a variable thickness vehicular airbag is provided. According to one configuration, the variable thickness vehicular airbag may comprise a primary cushion and a contact cushion. The primary cushion may comprise inner and outer panels joined at their respective outer peripheries, an inlet for inflating the airbag, and an outlet for transmitting an inflation fluid into the contact cushion. The contact cushion may additionally comprise an extension panel joined to the outer panel to encompass the outlet of the primary cushion.

The instant invention may be configured and installed in a vehicle for use as a thorax airbag, a thorax/pelvis airbag, a thorax/head airbag, or an inflatable curtain. The size of the extension panel of the variable thickness automotive airbag is selected to minimize the distance between the inflated contact cushion and an occupant of a vehicle. The instant invention teaches the addition of a contact cushion that adds very little size to the airbag in its deflated state. This renders it possible to use the airbag in housings provided for currently known airbags of lesser volume or thickness. In addition to the above, the contact cushion of the variable thickness airbag is positioned on the primary cushion so as to absorb the impact of an occupant with a wall of a vehicle during a side-impact collision. This includes primary cushions used in inflatable curtain applications having contact cushions placed to absorb the impact of the head and/or thorax of a vehicle occupant with the wall of a vehicle during a collision event or simulated collision event.

The contact cushion of the invention may be substantially rectangular, oval, or circular in shape. The primary cushion may further comprise at least one vent. Alternatively, a sealant may be applied to the airbag to slow deflation of the airbag after inflation. Additionally, the airbag may comprise a plurality of contact cushions.

The variable thickness vehicular airbag may have a primary cushion and a contact cushion. The primary cushion may similarly be composed of inner and outer panels, an inlet, and an outlet. As above, this airbag further comprises a contact cushion. The contact cushion may alternatively comprise an extension panel joined to an extension sleeve. The extension sleeve is joined to the primary cushion and encompasses the outlet. The variable thickness vehicular airbag may be used as a thorax airbag, a thorax/pelvic airbag, a thorax/head airbag, and an inflatable curtain airbag when installed.

The sizes of the extension sleeve and extension panel are selected to minimize the distance between the inflated airbag, including the contact cushion, and an occupant of a vehicle. In addition, the contact cushion is preferably positioned on the primary cushion so as to absorb the impact of an occupant with a wall of a vehicle during a side-impact collision. As discussed above, the contact panel may be made in a variety of shapes, including rectangular, oval, and circular.

Alternatively, the primary cushion comprises an inlet for allowing rapid inflation of the airbag and an attachment segment for attaching the airbag to a vehicle surface. The primary cushion further comprises an outlet. The airbag further comprises a contact cushion positioned to encompass the outlet.

This airbag may be configured for use as a thorax airbag, a thorax/pelvic airbag, a thorax/head airbag, or an inflatable curtain. As with the embodiments of the invention noted above, the sizes of the extension sleeve and extension panel of the variable width airbag are configured so as to minimize the distance between the contact cushion and an occupant of a vehicle when the airbag is inflated. This sizing may be customized for use in specific vehicles. Further, the contact cushion is positioned on the outer airbag panel to absorb the impact of an occupant with a wall of a vehicle or with objects or obstructions such as barriers, poles, other vehicles, or other high-hooded vehicles situated outside of the vehicle during a side-impact collision.

In these airbags, the shape of the extensible contact surface is substantially square, circular, rectangular, or oval, and may further comprise at least one vent. Additionally, the airbag may be coated with a sealant to slow deflation. Alternatively, the airbag may include a plurality of contact cushions.

Thus, the invention includes airbags having a contact cushion connected to a face of the primary airbag cushion. The contact cushion can be attached to an opening in either the occupant compartment-facing or door-facing face of the cushion. The primary and contact cushions may be composed of a single piece of material, or of multiple pieces of material. Further, the primary and contact cushions may be of any shape or orientation, including vertically or horizontally oriented, and rectangular, circular, or oval in shape. The airbag provides added thickness between the occupant of the vehicle and the sides of the vehicle without requiring modifications to the airbag's standard housing or inflator.

The nature of the present invention will become more fully apparent from the following description and appended claims, or may be learned by the practice of the invention as set forth hereinafter.

BRIEF DESCRIPTION OF THE DRAWINGS

In order that the invention of the instant application will be more readily understood, a more particular description of the invention will be rendered by reference to specific embodiments thereof that are illustrated in the appended drawings. Understanding that these drawings depict only typical airbags of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the apparatus, system, and method of the present invention, as represented in FIGS. 1 through 8, is not intended to limit the scope of the invention, as claimed, but is merely representative of presently preferred airbags of the invention.

Figure 1:
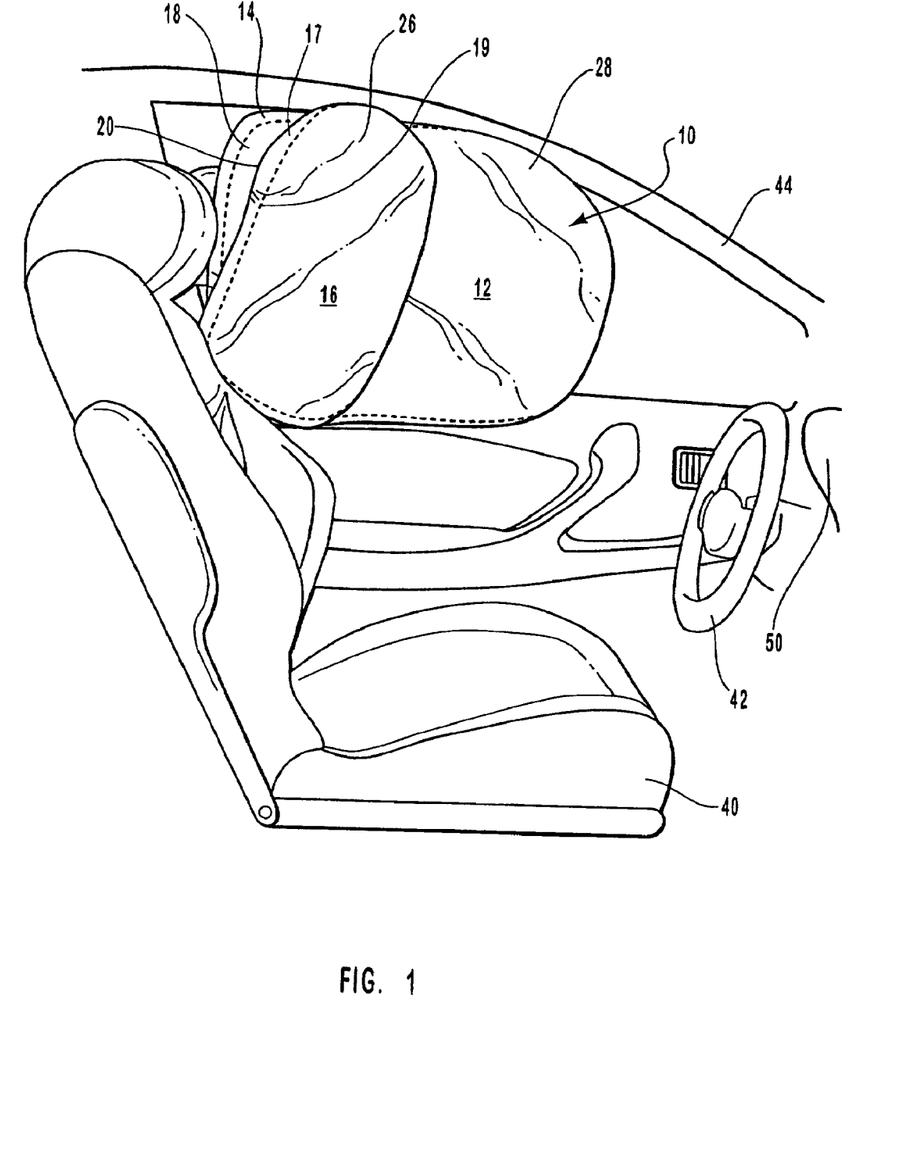
FIG. 1 is a perspective view of a side-impact airbag of the instant invention shown mounted in a vehicle in its inflated configuration.
Figure 2:
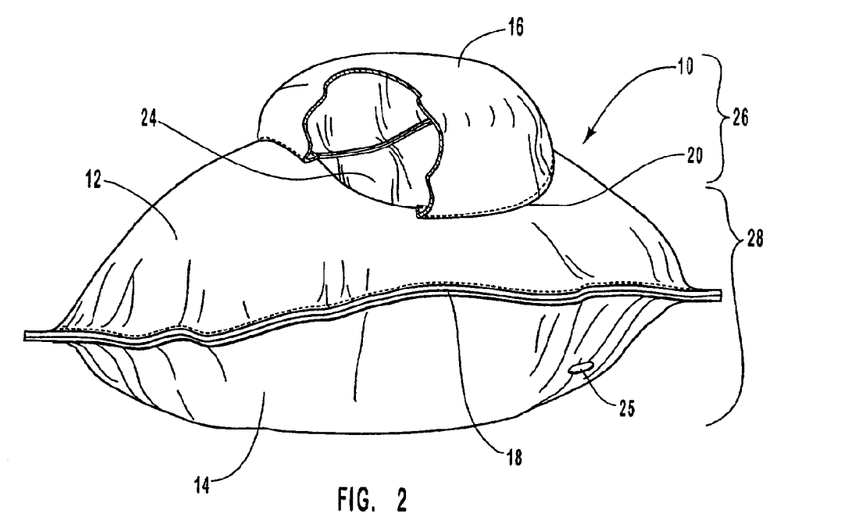
FIG. 2 is a partial cutaway perspective view of an embodiment of the invention in its inflated configuration.
Figure 3:
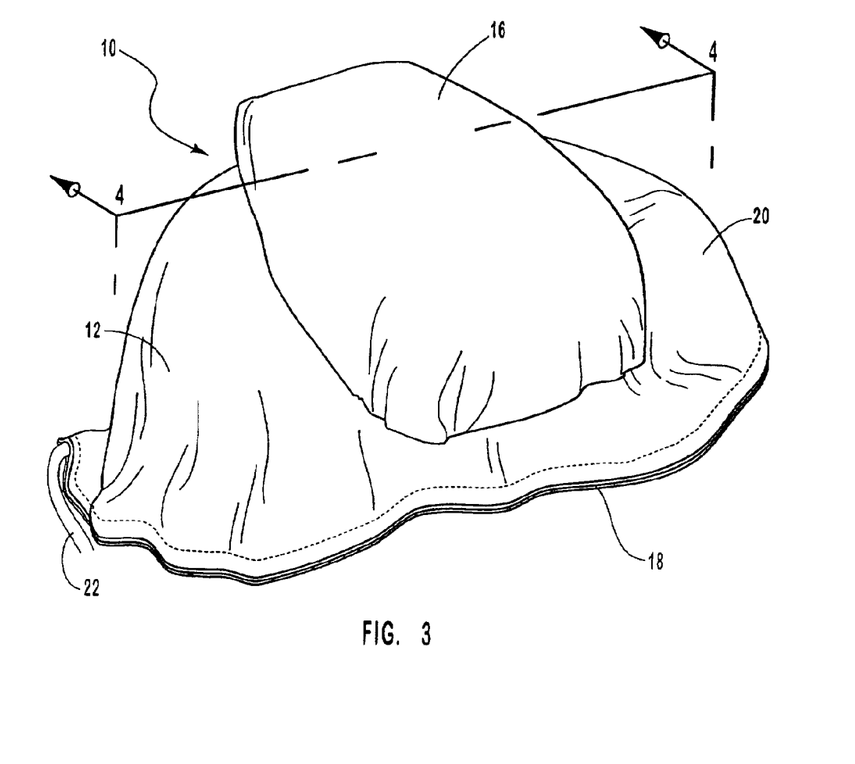
FIG. 3 is a perspective view of another embodiment of a side-impact airbag of the instant invention.

Referring to FIG. 1, a side-impact, variable thickness airbag 10 of the instant invention is depicted mounted and inflated within a vehicle. A first cushion of the airbag 10 is referred to herein as the primary cushion 28. This primary cushion may be comprised of two panels, including an occupant compartment-facing, or top panel 12, and a door-facing, or bottom panel, 14. This cushion also includes an airbag inlet 22 (as seen in FIG. 3), and at least one outlet 24 (as seen in FIG. 2). These panels are joined at their outer peripheries with a primary cushion seam 18.

A second cushion of the airbag 10 is referred to herein as the contact cushion 26. The contact cushion includes an expansion panel 16 and may further include an expansion sleeve 17. The contact cushion 26 is joined to the primary cushion 28 around an outlet 24 (as seen in FIG. 2). The contact cushion 26 may be joined either to the expansion sleeve 17 or to the expansion panel 16 by a contact cushion seam 20. In those airbags having an expansion panel 16 and an expansion sleeve 17, these components are joined by an expansion seam 19.

In FIG. 1, the airbag 10 is shown inflated and attached to a front seat 40 of a vehicle 38. The airbag may alternatively be attached to a steering wheel 42, a door 44, a rear seat 46, a roof rail 48, a dashboard 50, or another suitable location.

As illustrated, the primary cushion 28 includes a bottom panel (also referred to herein as the door-facing face) 14 and a top panel (also referred to herein as the occupant-facing face) 12. These panels are joined at their peripheries by a primary cushion seam 18. Many methods of joining such panels are known in the art, and include sewing and heat-sealing. Alternatively, seams may be used which function as vents for the airbag. Such vents, like the vent 25, function to rapidly deflate the airbag after a deceleration/impact event has passed. Thus, this primary cushion may further comprise vents in either of the panels of the airbag, or as noted above, in the periphery/seams. Alternatively, the primary cushion 28 may be a single, unitary body created by weaving.

In FIG. 1, the primary cushion 28 is shown to include a top panel 12 and a bottom panel 14. The top panel 12 has an outlet 24 (shown in FIG. 2), around which the contact cushion 26 is attached. Alternatively, the contact cushion 26 may be attached to the door-facing face 14 of the primary cushion 28. The contact cushion 26 is shown oriented vertically to protect the head or thorax of a vehicle occupant. The contact cushion 26 generally comprises an expansion panel 16 attached by expansion seam 19 to an expansion sleeve 17. The contact cushion 26 is attached to the primary cushion 28 by contact cushion seam 20.

The contact cushion 26 may be comprised of an expansion panel 16, and may be joined to an outlet 24 in a panel of the primary cushion 28 by contact cushion seam 20. As illustrated in FIG. 1 however, the contact cushion comprises an expansion panel 16. This panel is attached at its periphery to a first edge of an expansion sleeve 17 by expansion seam 19. A second edge of the expansion sleeve 17 is then attached to a panel of the primary cushion by contact cushion seam 20. The contact cushion 28 may include a vent in order to facilitate deflation of the airbag 10 after inflation. Alternatively, the contact cushion may further be coated with a sealant to slow the deflation of the airbag 10 after inflation.

FIGS. 2 and 3 further illustrate the airbag 10 of FIG. 1. As noted above, in airbag 10, the primary cushion 28 is comprised of a top panel 12 and a bottom panel 14 joined by primary cushion seam 18. FIG. 2 is a partially cut away view of the airbag of FIG. 1. This figure renders the interior of the contact cushion 26 visible, and includes the interior view of the contact cushion seam 20. In this airbag 10, the contact cushion 26 is comprised of an expansion panel 16 attached to a face of the primary cushion 28 by contact cushion seam 20. The contact cushion 26 is attached to surround an outlet 24 in the panel of the primary cushion. In this airbag 10, the primary cushion 28 of the airbag 10 further comprises a vent 25 to aid in deflation of the airbag after inflation.

FIG. 3 shows an alternate perspective view of the airbag 10 of FIGS. 1 and 2. In this Figure, inlet 22 is illustrated entering the airbag through the primary cushion seam 18. This inlet 22 allows the inflow of inflation gases produced by an inflator (not shown). Inlet 22 may be located on the front panel, the back panel, or, as shown in FIG. 3, in the primary cushion seam 18 at a periphery of the panels. Further, the primary cushion 26 comprises an outlet 24 (as shown in FIG. 2), which communicates with the contact cushion 28. This outlet 24 may take a large variety of shapes, including rectangular, oval, circular, and square. The outlet 24 allows an inflation fluid traveling through the primary cushion 26 to inflate the contact cushion 28, thus preparing it for impact by a vehicle occupant. If desired, the primary cushion 26 may further be coated by a sealant to slow deflation of the airbag 10 during a collision event.

Figure 4:
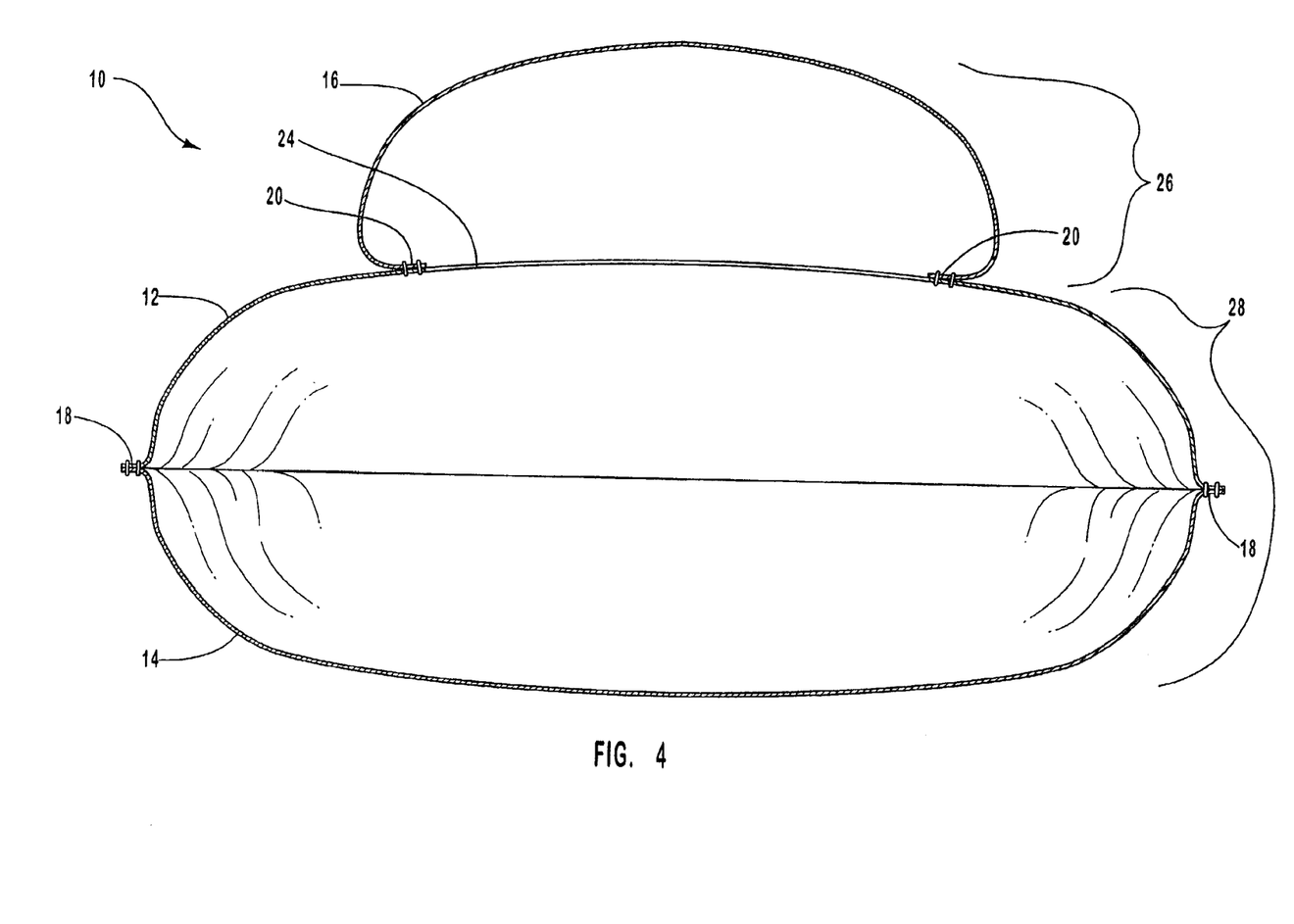
FIG. 4 is a cutaway view of the embodiment of the side-impact airbag of FIG. 3, taken along line 4—4.

Referring now to FIG. 4, a cut away view of the airbag 10 of FIG. 3 is shown, taken at line 4—4 of FIG. 3. This cross-sectional view shows the contact cushion seam 20, and the primary cushion seam 18. FIG. 4 further illustrates the attachment of the expansion panel 16 to a face of the primary cushion 28 around the periphery of the outlet 24. The contact cushion 26 is shown attached to top panel 12, but alternatively it may be attached to the bottom panel 14.

Figure 5:
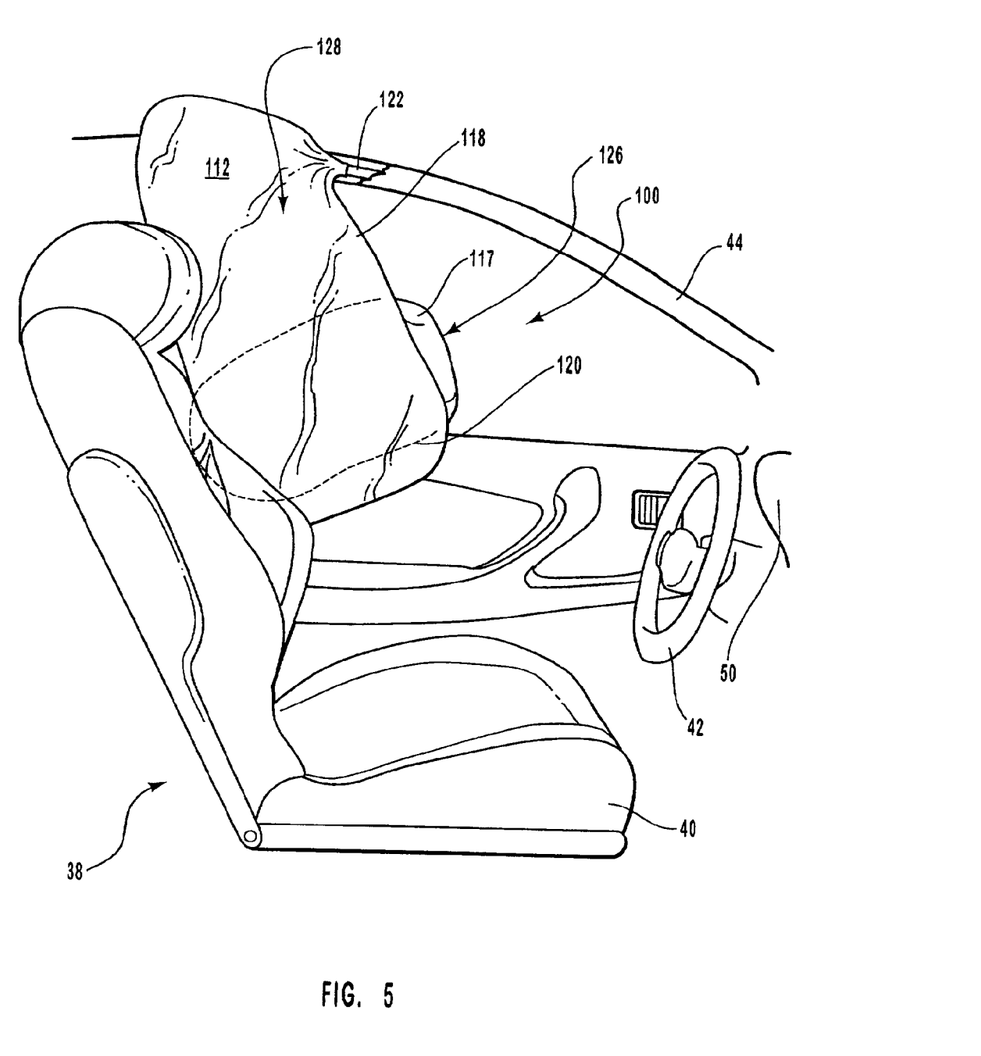
FIG. 5 is a perspective view of an alternative embodiment of the side-impact airbag of the instant invention, shown mounted in a vehicle in its inflated configuration.

FIG. 5 is a perspective view of another airbag 100 of the invention. This figure is a cut away view of a vehicle 38 with an airbag 100 in its inflated configuration mounted in the door 44 of the vehicle 38. In airbag 100 the contact cushion 126 is attached to the bottom, or door-facing panel 114 of the primary cushion 128. The contact cushion 126 comprises an expansion sleeve 117 and an expansion panel 116. As discussed above, the contact cushion 126 is attached to the primary cushion 128 by contact cushion seam 120. The airbag is shown mounted to a car door 44, having an inlet 122, which may comprise a gas guide, which is in fluid communication with an inflator (not shown). The contact cushion 126 is shown mounted substantially horizontally on the primary cushion 128. It buds off from the primary cushion approximately perpendicularly to contact surfaces such as the door 44 and possibly the window 52 of the car when in its inflated configuration.

Figure 6:
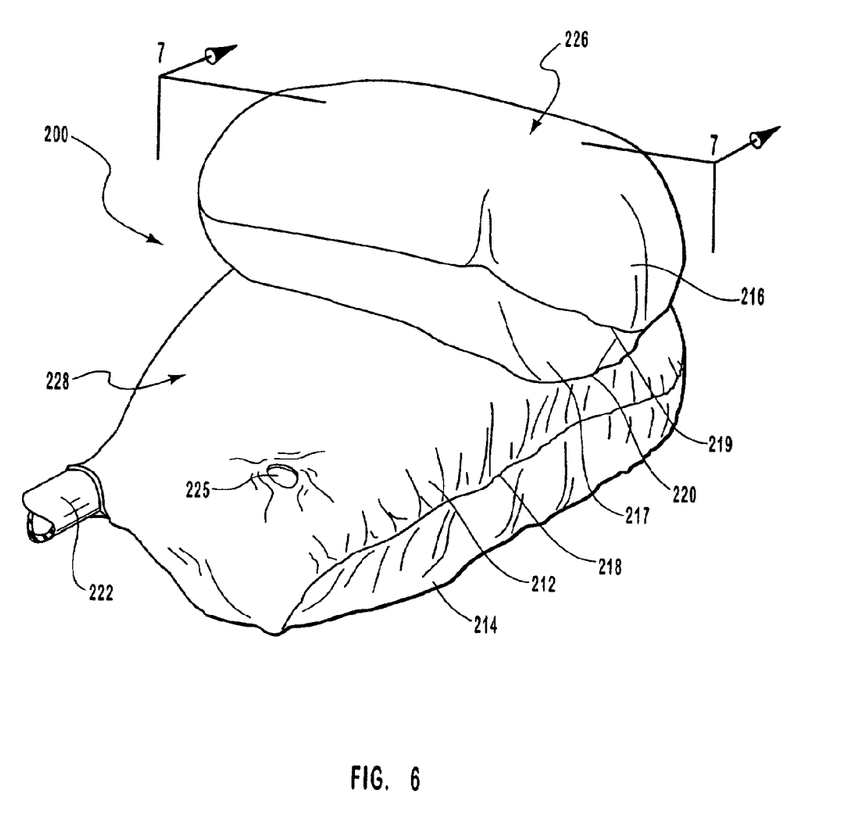
FIG. 6 is a perspective view of another embodiment of the side-impact airbag of the instant invention shown in its inflated configuration.
Figure 7:
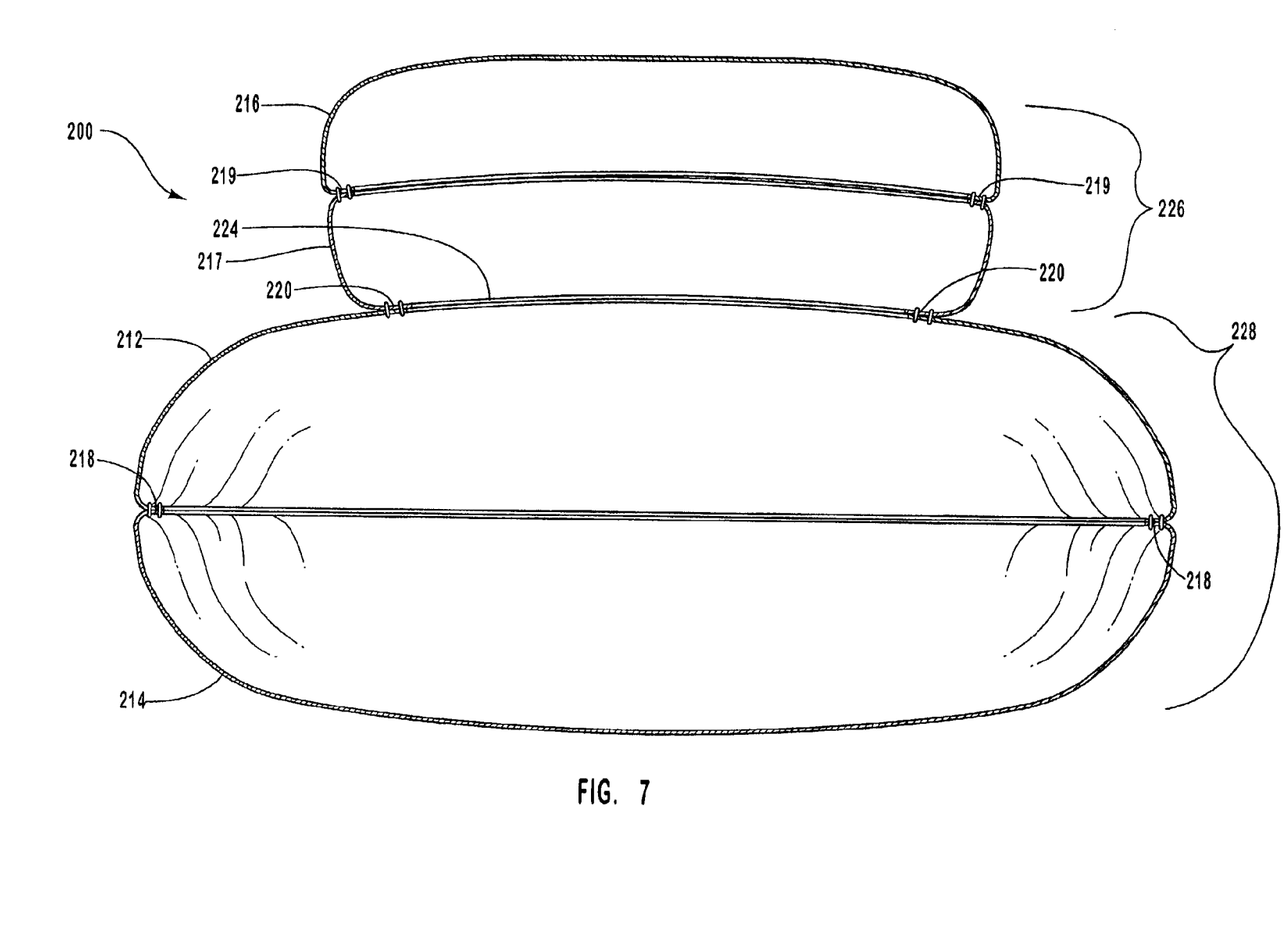
FIG. 7 is a cross sectional view of the embodiment of the side-impact airbag of FIG. 6, taken along line 7—7.

Referring now to FIG. 6, another airbag 200 within the scope of the invention is shown. In this airbag 200, the contact cushion 226 comprises an expansion panel 216 attached to an expansion sleeve 217 by an expansion seam 219. The contact cushion 226 buds off from the primary cushion in a largely perpendicular fashion. Further, the contact cushion 226 is oriented vertically in relation to the primary cushion 228. In FIG. 6, the primary cushion 228 here is shown to comprise a top panel 212 and a bottom panel 214 united by primary cushion seam 218. An inlet 222, which could comprise a gas guide or other similar coupling to an inflator, is also shown. The primary cushion 228 is further shown to comprise a vent 225 in addition to outlet 224 (as seen in FIG. 7). This outlet 224 communicates between the primary cushion 228 and the contact cushion 226.

FIG. 7 shows a cross-sectional view of the airbag of FIG. 6, taken at line 7—7 of FIG. 6. This Figure shows the relationship of the various panels of airbags of the instant invention. First, the primary cushion 228 is shown to comprise a bottom, or door-facing panel 214, and a top, or occupant compartment-facing panel 212. These panels are united at their peripheries by a primary cushion seam 218. As seen in FIG. 4 and FIG. 7, this seam may be constructed with the resulting seam on the outside or inside of the airbag. As illustrated, the contact cushion comprises an expansion sleeve 217. This sleeve 216 may be attached to the primary cushion on one edge of its periphery to the edge of the outlet 224 of the top panel 212. This attachment is referred to as contact cushion seam 220. This expansion sleeve 217 is then attached by a second edge to expansion panel 216 by an expansion seam 219. Both the contact cushion seam 220 and the expansion seam 219 may be varied in a manner similar to the primary cushion seam 218.

Figure 8:
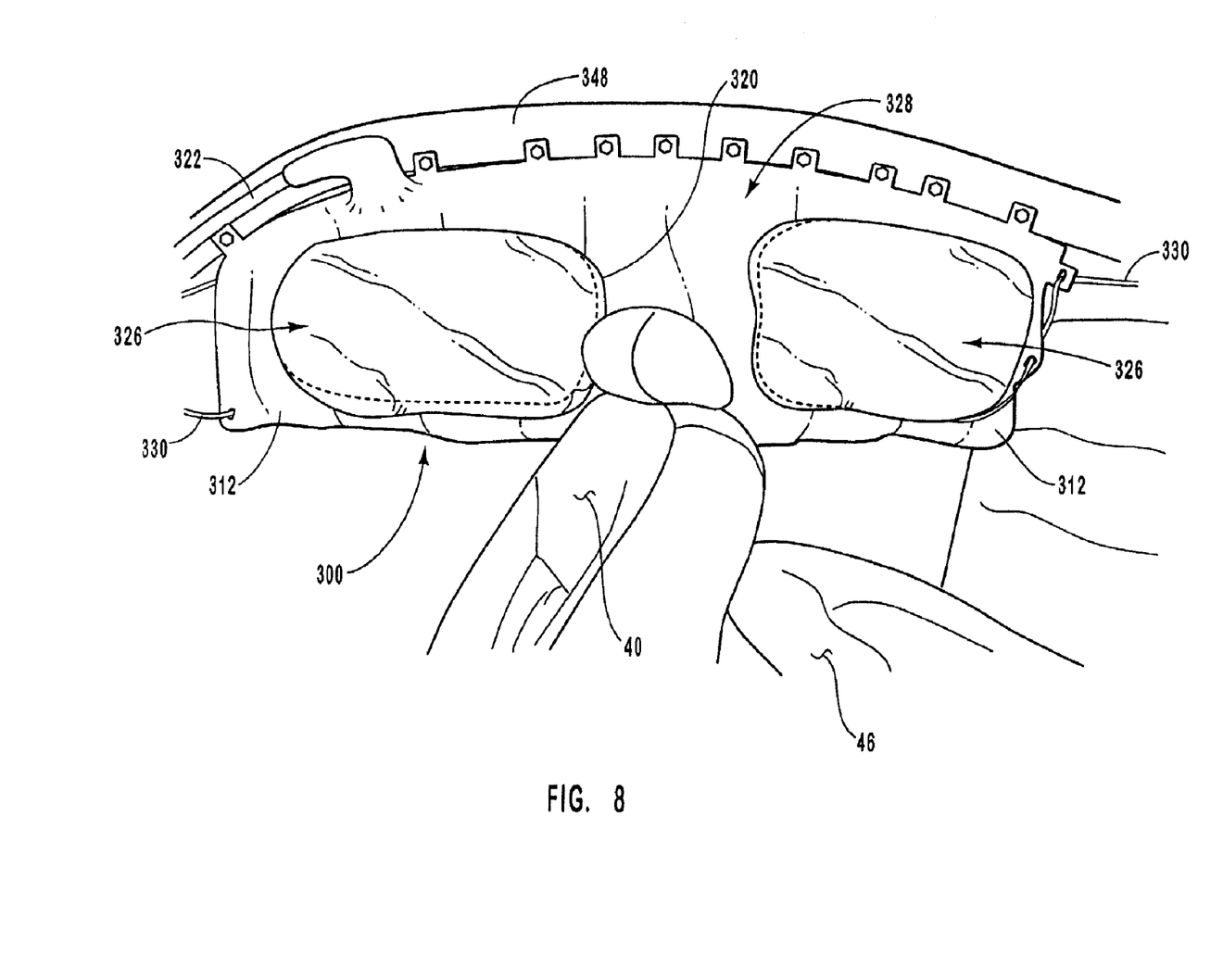
FIG. 8 is a perspective view of an inflatable curtain embodiment of the side-impact airbag of the invention shown in its inflated configuration.

Referring now to FIG. 8, an inflatable curtain airbag 300 of the instant invention is shown. This airbag 300 is shown to embody two separate contact cushions 326 which protrude from a primary cushion 328. The primary cushion 328 is shown to extend for substantially the entire length of the vehicle 38. The contact cushions 326 are positioned proximate to the front seat 40 and the rear seat 46. The contact cushions 326 are here shown to be attached to the primary cushion 328 by a contact cushion seam 320.

This airbag 300 may be varied by increasing its size, and also by adding contact cushions 326 to render the airbag 300 suitable for use in larger passenger vehicles such as minivans, vans, sport utility vehicles, and station wagons. More specifically, these additional contact cushions 326 may be positioned such that each position capable of seating an occupant has a corresponding contact cushion 326. Further, multiple contact cushions 326 may be deployed for each occupant desired to be protected, each contact cushion 326 positioned to act on a different part or region of the occupant's body. Such a contact cushion 326 is placed for contact with a head, and a second contact cushion 326 is placed for contact with the shoulders or torso of the occupant.

Airbags 10, 100, 200, and 300 of the present invention may be inflated by several different methods. One such method involves the use of a forward-mounted inlet, 322, as shown, which could comprise a gas guide. Other inflation methods might use multiple inflators, a single inflator mounted in the back of the vehicle 38, a single inflator (such as inflator 322) mounted in the front region of the vehicle 38, a single inflator mounted in the center region of the vehicle 38, and any combination of the above. The inflation system must inflate the curtain to a sufficient pressure suitable for use. Curtains such as 300 illustrated in FIG. 8 may comprise a tether 330 for securing the airbag. As shown in FIG. 8, these tethers 330 are positioned at opposing ends of the curtain, but may be dispersed along the length of the airbag 300 in larger or smaller numbers.

The instant invention was tested by comparing an airbag module using a baseline airbag cushion with two airbag modules including the adjustable volume airbag cushion of the present invention. The airbags were subjected to a nine-mile-per-hour impact from a dummy. Prior to the test, the airbags were packaged in an identical module housing, and each used an identical inflator. The results of this test are shown in Table 1, wherein "AVC" denotes the use of the Adjustable Volume Cushion of the present invention.

TABLE 1

| 9 MPH Linear Impact, Utah | Thickness (mm) | Volume (liters) | Module Deceleration (g) | Displacement (mm) |
| --- | --- | --- | --- | --- |
| Baseline | 200 | 11 | 16 | 716 |
| Baseline with AVC | 235 | 11 | 17 | 638 |
| Baseline with AVC | 270 | 15 | 13 | 693 |

The baseline airbag module inflated to a thickness of 200 mm and held a fluid volume of 11 liters. This airbag demonstrated a deceleration of 16 g, and a displacement of 708 mm. The first 320-side airbag module with an integrated contact face inflated to a thickness of 235 mm, and held a fluid volume of 11 liters. This airbag demonstrated a deceleration of 17 g, and a displacement of only 638 mm. Finally, the second 320-side airbag with an integrated contact cushion inflated to a thickness of 270 mm, and held a fluid volume of 15 liters. This airbag demonstrated a deceleration of 13 g, and a displacement of 693.

These data suggest that in higher-velocity impacts, the 320 airbag alone has a higher possibility of dummy "strikethrough." Further, the size and shape of the contact cushion can be adjusted to provide either a thicker total airbag, or a higher volume airbag. It thus appears that thicker airbags without large volume increases are capable of decelerating impacting bodies more quickly with less displacement. Similarly, it appears that thicker airbags with higher volumes provide lower deceleration rates in a higher-volume cushion. Thus, it is possible to provide better occupant protection by tailoring the protection provided by a side-impact airbag to the characteristics of the vehicle into which it is installed. This may be accomplished by changing either thickness or total volume to better protect the occupant of the vehicle during a collision during which the airbag inflates.

Impact protection can be tailored based on vehicle impact performance characteristics. If a vehicle has little side structure, it is likely that the door portion of the vehicle will strike the occupant with a speed nearly equivalent to that of the impacting object. Use of a thick, hard airbag cushion like the 11-liter model of 235 mm thickness would not be appropriate in this situation. In contrast, if the vehicle has a well-reinforced side structure, then the door will impact the dummy at the momentum velocity. This situation would most appropriately require an airbag module with a thicker, softer bag such as an airbag similar to the 15-liter, 270 mm airbag model referenced above.

Accordingly, the present invention provides an airbag suitable for use as a side-impact thorax airbag, head/thorax airbag, thorax/pelvis airbag, and inflatable curtain that may be adapted in size to minimize the distance between a vehicle occupant and the deployed airbag. The thickness of the airbag may be increased to provide better deceleration of a vehicle occupant without creating the need to modify the airbag housing or inflator. Additionally, the airbag may be modified to suit the specific cushioning needs, compartment space limitations, and housing size limitations of a specific vehicle.

The present invention may be embodied in other specific forms without departing from its structures, methods, or other essential characteristics as broadly described herein and claimed hereinafter. The described airbags are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A variable thickness vehicular airbag comprising:
   a primary cushion having inner and outer panels joined at their respective outer peripheries, an inlet, and an outlet; and
   a contact cushion having an extension panel joined to the outer panel, the extension panel encompassing the outlet such that an inflation fluid entering the primary cushion through the inlet passes into the contact cushion through the outlet, thus inflating the contact cushion; wherein the contact cushion is positioned on the primary cushion so as to absorb the impact between an occupant and a side of a vehicle during a collision.

2. The variable thickness vehicular airbag of claim 1, wherein the primary cushion is configured for use as a thorax airbag when installed.

3. The variable thickness vehicular airbag of claim 1, wherein the primary cushion is configured for use as a thorax/pelvic airbag when installed.

4. The variable thickness vehicular airbag of claim 1, wherein the primary cushion is configured for use as a thorax/head airbag when installed.

5. The variable thickness vehicular airbag of claim 1, wherein the primary cushion is configured for use as an inflatable curtain airbag when installed.

6. The variable thickness vehicular airbag of claim 1, wherein the size of the extension panel is selected so as to reduce the distance between the contact cushion and an occupant of a vehicle when the airbag is installed in a vehicle and inflated.

7. The variable thickness vehicular airbag of claim 1, wherein the contact panel is substantially rectangular in shape.

8. The variable thickness vehicular airbag of claim 1, wherein the contact panel is substantially oval in shape.

9. The variable thickness vehicular airbag of claim 1, wherein the primary cushion further comprises at least one vent.

10. The variable thickness vehicular airbag of claim 1, wherein the primary and contact cushions are coated with a sealant to slow deflation of the airbag after inflation.

11. The variable thickness vehicular airbag of claim 1, wherein the airbag comprises a plurality of contact cushions.

12. A variable thickness vehicular airbag comprising:
    a primary cushion comprising inner and outer panels joined at their respective outer peripheries, an inlet, and an outlet; and
    a contact cushion having an extension panel joined on its outer edge to a first edge of an extension sleeve, wherein the extension sleeve is joined by a second edge to the outer panel of the primary cushion so as to encompass the outlet such that an inflation fluid entering the primary cushion through the inlet passes into the contact cushion through the outlet, thus inflating the contact cushion; wherein the contact cushion is positioned on the primary cushion to position the primary cushion so as to absorb the impact between an occupant and a side of a vehicle during a collision.

13. The variable thickness vehicular airbag of claim 12, wherein the primary cushion is configured for use as a thorax airbag when installed.

14. The variable thickness vehicular airbag of claim 12, wherein the primary cushion is configured for use as a thorax/pelvic airbag when installed.

15. The variable thickness vehicular airbag of claim 12, wherein the primary cushion is configured for use as a thorax/head airbag when installed.

16. The variable thickness vehicular airbag of claim 12, wherein the primary cushion is configured for use as an inflatable curtain airbag when installed.

17. The variable thickness vehicular airbag of claim 12, wherein the sizes of the extension sleeve and extension panel are selected so as to minimize the distance between the contact cushion and an occupant of a vehicle when the airbag is installed in a vehicle and inflated.

18. The variable thickness vehicular airbag of claim 12, wherein the contact panel is substantially rectangular in shape.

19. The variable thickness vehicular airbag of claim 12, wherein the contact panel is substantially oval in shape.

20. The variable thickness vehicular airbag of claim 12, wherein the primary cushion further comprises at least one vent.

21. The variable thickness vehicular airbag of claim 12, wherein the primary and contact cushions are coated with a sealant to slow deflation of the airbag after inflation.

22. The variable thickness vehicular airbag of claim 12, wherein the airbag comprises a plurality of contact cushions.

23. A variable thickness vehicular airbag comprising:

an inner airbag panel comprising an inlet for allowing rapid inflation of the airbag by an inflation fluid upon activation, and an attachment segment for attaching the airbag to a vehicle surface;

an outer airbag panel comprising a base contact surface and an extensible contact surface; said base contact surface and said inner airbag panel being attached at their peripheries, said base contact surface comprising an outlet;

wherein said extensible contact surface comprises an extension sleeve and an extension panel, said extension panel being attached on one edge to said outer airbag panel encompassing said outlet, and being attached on an opposing edge to an outer periphery of the contact panel; wherein the contact cushion is positioned on the primary cushion so that both the primary cushion and the contact cushion absorb the impact between an occupant and a side of a vehicle during a collision.

24. The variable thickness vehicular airbag of claim 23, wherein the inner and outer airbag panels are configured for use as an airbag selected from the group consisting of: thorax airbags, thorax/pelvic airbags, thorax/head airbags, or inflatable curtain airbags.

25. The variable thickness vehicular airbag of claim 24, wherein the size of the extension sleeve and extension panel are configured so as to minimize the distance between the contact cushion and an occupant of a vehicle when the airbag is inflated.

26. The variable thickness vehicular airbag of claim 23, wherein the shape of the extensible contact surface is substantially square, circular, rectangular, or oval.

27. The variable thickness vehicular airbag of claim 23, wherein the inner airbag panel further comprises at least one vent.

28. The variable thickness vehicular airbag of claim 23, wherein the airbag is coated with a sealant to slow deflation.

29. The variable thickness vehicular airbag of claim 23, wherein the airbag comprises a plurality of contact cushions.

\* \* \* \* \*